UNITED STATES PATENT OFFICE.

CHARLES STAUBES, OF SAN JOSÉ, CALIFORNIA.

PROCESS OF PRESERVING UNFERMENTED GRAPE-JUICE.

SPECIFICATION forming part of Letters Patent No. 555,830, dated March 3, 1896.

Application filed August 20, 1894. Serial No. 520,829. (No specimens.)

*To all whom it may concern:*

Be it known that I, CHARLES STAUBES, of San José, in the county of Santa Clara and State of California, have invented a new and useful Improvement in Processes of Preserving Unfermented Grape-Juice, of which the following is a specification.

My invention is an improved process of preserving unfermented grape-juice, and the process has for an object to destroy all fermentation properties in grape-juice, at the same time producing a palatable beverage closely resembling wine, yet absolutely non-alcoholic, having the same color as wine with the taste and flavor of the natural grape, its medicinal properties being unimpaired and its keeping qualities being equal to those of the fermented wines.

I will now describe my process in detail, specifying the length of time the juice is stored in casks, such periods being those which have in practice proven to be satisfactory; but manifestly variations of such periods would not necessarily involve a departure from the spirit of my invention.

Crush the juice from the stems, seeds, and skins into an open vat for mixing purposes and add to one hundred and fifty gallons of juice twenty ounces benzoate of sodium. Mix thoroughly with pole. Take new puncheon, one hundred and fifty gallons, cleanse thoroughly, and with a sulfur-burner burn sulfur in the puncheon until it is filled with sulfur dioxid. When the flames of the sulfur are extinguished, fill up the puncheon with the grape-juice and bung up tightly. Put on skid in cool place, not to exceed 60° Fahrenheit. Let it remain thirty days, after which time add two table-spoonfuls of table-salt. Then bung tightly and let stand for five days, after which take well-cleaned new wooden barrels, fifty gallons each, prepare them by sulfur process, as before stated, and siphon from the puncheon and add to each barrel five ounces benzoate of sodium. Bung the barrels tightly and put in cool place, as before, there to remain six weeks, after which take clean puncheons, sulfur lightly, as before, and fill in the juice by means of buckets, so as to bring it in contact with the air to remove the sulfur taste. Then bung up tightly, and after forty-eight hours add two table-spoonfuls of salt to each puncheon. Do not bung it up for twenty-four hours, and then add three pounds of Spanish clay, (after dissolving in little grape-juice in a separate vessel,) thoroughly mix with a stick, and bung tightly for thirty days. Siphon the clean grape-juice into fresh-cleansed lightly-sulfured puncheon and bung up when full to exclude air, and after twenty-four hours add to each puncheon two table-spoonfuls of salt, two ounces powdered horse-radish root, and four ounces of tannin, (the latter being previously dissolved in one pint of warm distilled water and permitted to cool before adding to the grape-juice.) Mix all thoroughly, and after twenty-four hours insert the bung gently and let stand twenty-one days, after which rack the juice into freshly-washed and lightly-sulfured packages and clarify each puncheon with four ounces isinglass. Then let stand thirty days, after which time it is racked into packages from which it can be drawn for use.

The Spanish clay named above is an article sold upon the market as such, and to the best of my information is a mineral substance and is imported from Spain.

After numerous experiments I find that by adding Spanish clay to the grape-juice which has been subjected to the benzoate of soda it has a destructive action on all animal matter or fermenting germs contained in the grape-juice. At the same time it improves the appearance of the juice by giving it a sparkling and bright color and reduces the tartaric acid and acts as a powerful clarifier.

Having thus described my invention, what I claim as new, and desire to secure by Letters Patent, is—

1. The process of preserving unfermented grape-juice herein described consisting in first expelling the juice then mixing therewith benzoate of sodium, inclosing such juice in a sulfured cask subsequently adding common salt thereto, then transferring the juice to previously-sulfured barrels or casks, then adding benzoate of sodium, then transferring the juice to clean sulfured barrels exposing it during such transfer to the air, subsequently adding Spanish clay, salt, horse-radish root and tannin substantially as set forth.

2. The process of preserving unfermented grape-juice herein described which consists in subjecting the juice to the action of benzoate of sodium, common salt, Spanish clay, horse-radish root and tannin by mixing the same therewith, substantially as described.

CHARLES STAUBES.

Witnesses:
W. G. HAWLEY,
ANNIE STAUBES.